(12) United States Patent
Wheals

(10) Patent No.: US 7,326,144 B2
(45) Date of Patent: Feb. 5, 2008

(54) VEHICLE TRANSMISSION SYSTEMS

(75) Inventor: Jonathan Charles Wheals, Loughborough (GB)

(73) Assignee: Ricardo UK Limited, West Sussex (GB)

( * ) Notice: Subject to any disclaimer, the term of this patent is extended or adjusted under 35 U.S.C. 154(b) by 231 days.

(21) Appl. No.: 10/525,334

(22) PCT Filed: Aug. 20, 2003

(86) PCT No.: PCT/GB03/03639

§ 371 (c)(1),
(2), (4) Date: Sep. 8, 2005

(87) PCT Pub. No.: WO2004/018248

PCT Pub. Date: Mar. 4, 2004

(65) Prior Publication Data
US 2006/0105878 A1    May 18, 2006

(30) Foreign Application Priority Data
Aug. 22, 2002 (GB) .................. 0219624.4

(51) Int. Cl.
*F16H 37/08* (2006.01)
(52) U.S. Cl. ............. 475/205; 475/206; 475/275; 475/284; 180/248; 180/252
(58) Field of Classification Search ............ 475/18, 475/19, 201, 204, 205, 206, 210, 221, 275, 475/284
See application file for complete search history.

(56) References Cited

U.S. PATENT DOCUMENTS

| | | | | |
|---|---|---|---|---|
| 4,449,604 A | * | 5/1984 | Suzuki | 180/233 |
| 4,612,824 A | * | 9/1986 | Ruhle | 475/204 |
| 4,716,787 A | | 1/1988 | Miura et al. | |
| 5,176,589 A | * | 1/1993 | Borgudd | 475/221 |
| 5,518,463 A | * | 5/1996 | Shibahata et al. | 475/220 |

FOREIGN PATENT DOCUMENTS

| | | |
|---|---|---|
| DE | 43 35 552 | 5/1994 |
| EP | 0 424 054 | 4/1991 |
| GB | 056094 | 9/1931 |
| GB | 0203026.0 | 2/2002 |
| WO | WO 02/09966 | 2/2002 |
| WO | WO 03/066363 | 8/2003 |

* cited by examiner

*Primary Examiner*—David D. Le
(74) *Attorney, Agent, or Firm*—Reed Smith LLP

(57) ABSTRACT

A vehicle transmission system includes an input shaft connected to a differential mechanism, which has two output shafts. The two output shafts carry first and second coaxially mounted sun wheels, respectively, of an epicyclic gear system which mesh with first and second sets of planet wheels, respectively, which mesh with first and second annulus wheels, respectively. Each planet wheel is mounted to rotate independently about a respective planet shaft and the planet shafts are connected to a common carrier, which is rotatably mounted coaxially with the first and second sun wheels. The first and second annulus wheels are connected together. The carrier is connected to selectively operable speed changing device arranged to increase or decrease the speed of rotation of the carrier about its axis.

10 Claims, 2 Drawing Sheets

VEHICLE TRANSMISSION SYSTEMS

FIELD OF THE INVENTION

Figure 1:
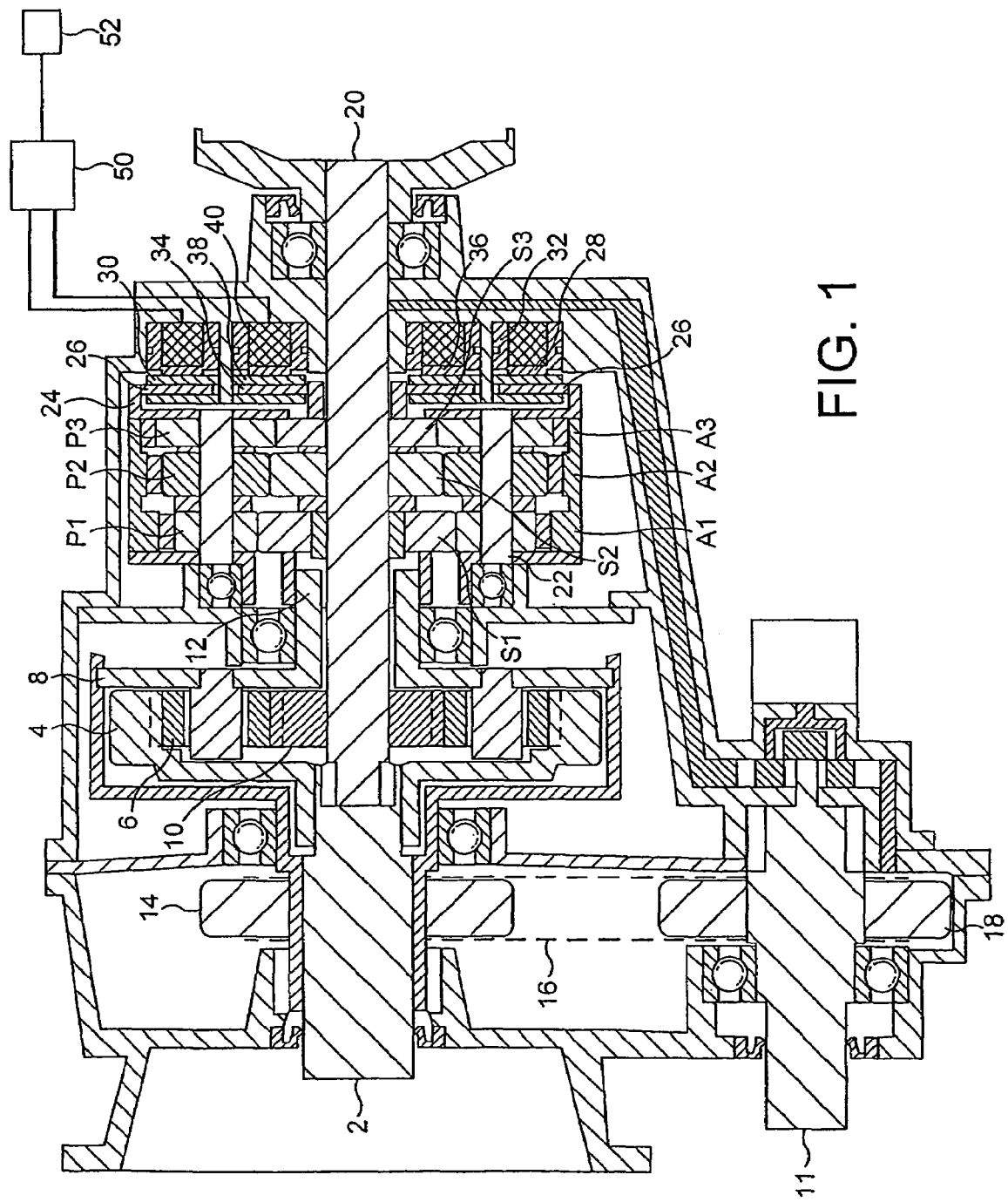

The present invention relates to vehicle transmission systems and is particularly, though not exclusively, concerned with transmission systems for four wheel drive vehicles.

BACKGROUND OF THE INVENTION

International Patent Application No. WO 02/09966 discloses a transmission system for use in a four wheel drive vehicle for transferring the torque between the front and rear axles in accordance with requirements. The transmission system disclosed therein includes an epicyclic differential mechanism, the annulus of which constitutes the input of the transmission and the carrier and sun wheel of which constitute its two outputs which are connected, in use, to respective pairs of driven wheels of the vehicle. The two output shafts carry first and second coaxial sun wheels of an epicyclic gear system which mesh with first and second sets of planet wheels, respectively. The epicyclic gear system includes a third sun wheel, which is coaxial with the first and second sun wheels and is in mesh with a third set of planet wheels. The gear ratios of the first sun wheel with the first set of planet wheels, the second sun wheel with the second set of planet wheels and the third sun wheel with the third set of planet wheels are different. Each first planet wheel is connected to respective second and third planet wheels to rotate therewith about a respective common planet shaft. The planet shafts are connected to a common carrier which is rotatably mounted coaxially with the sun wheels. The carrier is connected to a first selectively operable brake and the third sun wheel is connected to a second selectively operable brake. The transmission system includes a sensor arranged to produce a signal indicative of an operating parameter of the vehicle, such as its acceleration, and a controller connected to the sensor and to the two brakes and arranged to operate the brakes in response to the said signal. Operation of the brake connected to the third sun wheel produces a torque transfer from one output shaft to the other and operation of the other brake produces the reverse effect.

British Patent Application No. 0203026.0 discloses a somewhat modified transmission system in which the third sun wheel and associated set of planet wheels are omitted and single speed changing device, e.g. an electric motor, is connected to the common carrier and arranged to speed it up or slow it down. Thus, it was realised that speeding up the carrier has the same effect as slowing down the third sun wheel and thus that the third sun wheel is not needed at all.

Both of the above transmission systems are extremely effective but do suffer from one problem. Thus each planet wheel is connected to one or two further planet wheels with which it forms a rigid unit. It is found in practice that it is extremely difficult to align the teeth on the planet gears relative to one another and to repeat this for each group of planet wheels. This means in practice that all the torque is transmitted through only one of the sets of planet wheels and that the other sets transmit little or no torque at all. If the misalignment error is greater than the backlash between the gear teeth it is impossible to assemble the system. This means that one of the primary advantages of epicyclic gearsets, namely the splitting of the torque transmission between, typically, three or four planet wheels is lost. Since one can not readily predict which set of planet wheels will be the one that transmits the torque, the practical solution is to provide only one set of planet wheels. However, since this set will necessarily transmit all the torque, it will have to be very much more massive than would otherwise have been the case and thus results in an unacceptable increase in size of the transmission system.

SUMMARY OF THE INVENTION

Accordingly, it is the object of the invention to provide a transmission system which has all the advantages of the transmission systems disclosed in the prior applications referred to above but does not suffer from the disadvantage of those transmission systems.

According to the present invention, a transmission system for a vehicle includes an input shaft connected to a differential mechanism, which has two output shafts, the two output shafts carrying first and second coaxially mounted sun wheels, respectively, of an epicyclic gear system which mesh with first and second sets of planet wheels, respectively, which mesh with first and second annulus wheels, respectively, the gear ratios of the first sun wheel with the first set of planet wheels and the second sun wheel with the second set of planet wheels being different, each planet wheel being mounted to rotate independently about a respective common planet shaft, the planet shafts being connected to a common carrier which is rotatably mounted coaxially with the first and second sun wheels, the first and second annulus wheels being connected together, the carrier being connected to a selectively operable speed changing means arranged to increase or decrease the speed of rotation of the carrier about its axis, the transmission system further including at least one sensor arranged to produce a signal indicative of an operating parameter of the vehicle or its engine and a controller connected to the sensor and to the speed changing means and arranged to operate the speed changing means in response to the said signal.

The transmission system may therefore include a number of planet shafts equal to the total number of planet wheels. It is, however, convenient if each first planet wheel is associated with a respective second planet wheel to constitute a set of planet wheels, each set of planet wheels being independently rotatably carried by a respective common planet shaft. In this case the number of first and second planet wheels will be equal to the number of sets of planet wheels.

Thus the transmission system in accordance with the present invention operates in a manner generally very similar to that in the two prior applications referred to above. However, the planet wheels are no longer necessarily connected together in pairs and no longer rotate as a unit but are instead mounted on their respective planet shafts to rotate independently. The problem referred to above of the difficulty of aligning the planet wheels of each pair or group so that the transmitted torque is shared equally between all the planet wheels is thereby automatically eliminated. Thus the planet wheels of each epicyclic can rotate relative to the planet wheels of the other epicyclic to permit it to transmit torque effectively. It is, however, essential if the epicyclic gear system is to operate that there be a rotary link between the two epicyclics and this is achieved in the construction in accordance with the invention by additionally providing a respective annulus wheel with which the planet wheels of the epicyclics mesh, the annulus wheels all being connected together to form a unit. In practice, the annulus wheels are likely simply to be different sets of teeth on a single annulus wheel.

The speed changing means may be an electric motor arranged both to increase and decrease the speed of rotation of the carrier about its axis. In this case, the transmission system may be controlled so that the torque transmitted through either one of the two axles varies between 0% and 100% of the total engine torque. This is, however, not always necessary and in an alternative embodiment the speed changing means simply constitutes a first brake. Thus if the epicyclic gear system includes only two epicyclic gear trains and only a single brake, it is only possible for torque to be transferred from one axle to the other axle but not vice versa. However, in many applications, this may be all that is required. Thus if the transmission system is set up so that, for instance, 80% of the torque is normally transmitted to the rear axle and 20% of the torque to the front axle, the torque distribution may be varied between those figures and 100% on the front axle and 0% on the rear axle. However, it will not be possible to vary the torque transmitted through the front axle to a value of less than 20%.

Whilst the epicyclic gear system may include only two epicyclic gear trains, in a further embodiment it includes a third sun wheel, which is mounted coaxially with the first and second sun wheels and is in mesh with a third set of planet wheels, the third set of planet wheels being in mesh with a third annulus wheel, which is connected to the first and second annulus wheels, the gear ratio of the third sun wheel with the third set of planet wheels being different to that of the second and first sun wheels with the second and first sets of planet wheels, respectively, each third planet wheel being mounted to rotate independently on a respective planet shaft, the third sun wheel being connected to a second selectively operable brake. In one embodiment, each third planet wheel is associated with a respective pair of first and second planet wheels to form a set of planet wheels, each set of planet wheels being mounted to rotate independently on a respective planet shaft. Thus this embodiment is analogous to that disclosed in International Application No. WO 02/09966 but again the planet wheels of each group of planet wheels, comprising a first planet wheel, a second planet wheel and a third planet wheel, are free to rotate independently of one another. All three annulus wheels are connected together in this case to provide the necessary torque link between the three epicyclic gear sets. The provision of the two selectively operable brakes in this embodiment means that the torque division between the two axles may be varied at will between 0% and 100%.

In a particularly compact embodiment, the first and second brakes include annular brake discs which lie substantially in a single plane.

Further features and details of the invention will be apparent from the following description of two specific embodiments of transmission system in accordance with the invention which is given by way of example only with reference to the accompanying diagrammatic drawings, in which:

BRIEF DESCRIPTION OF TNE DRAWINGS

Figure 2:
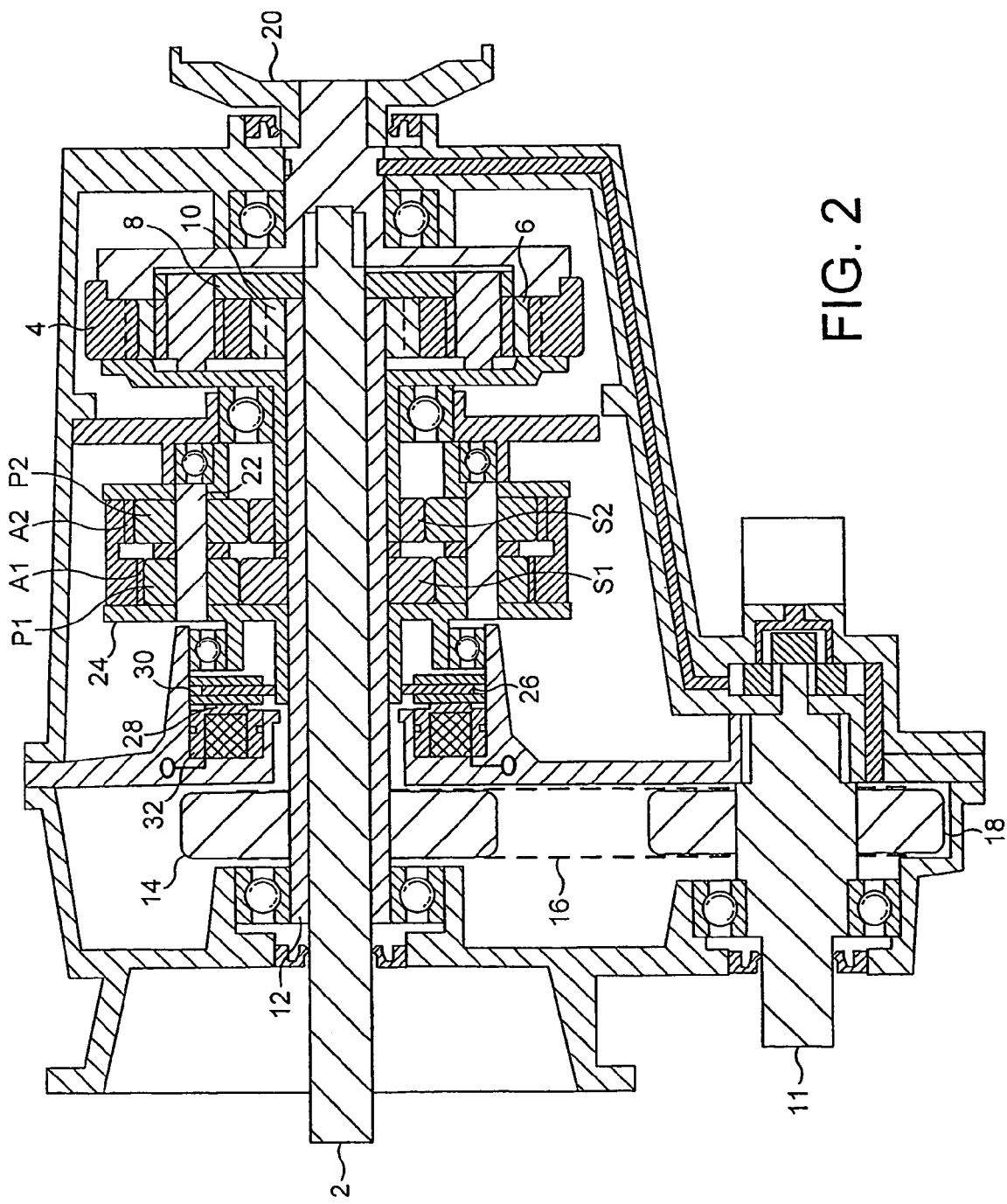

FIG. 1 is an axial sectional view of a centre differential for a four wheel drive vehicle; and FIG. 2 is a similar view of a modified construction of a centre differential.

DETAILED DESCRIPTION OF THE DRAWINGS

FIG. 1 shows a transmission system with an input shaft 2 which, in use, will be connected to or constitute part of the output from the gearbox of the vehicle engine. The shaft 2 is connected to the annulus 4 of an epicyclic differential. Formed on the interior of the annulus 4 is an annular array of gear teeth with which the teeth on a number of planet gears 6 mesh. The planet gears 6 are carried by a common carrier 8 and mesh with a sun gear 10. The carrier 8 is connected to a first hollow output shaft 12 which is connected to the front axle 11 of the vehicle, not shown, by way of a coupling, in this case a chain drive coupling 14, 16, 18. The sun gear 10 is carried by a shaft 20 which is connected to the rear axle, typically through the rear differential.

The output shafts 12 and 20 are connected to a further epicyclic differential gear system which splits the torque transmitted through the two output shafts in a manner appropriate to the operating conditions of the vehicle. The front wheel output shaft 12 is connected to rotate with a sun wheel S1 and the rear wheel output shaft 20 carries a coaxial sun wheel S2. Mounted concentrically with these two sun wheels is a further sun gear S3. The three sun wheels S1, S2 and S3 are in mesh with respective sets of three planet wheels P1, P2 and P3. The various planet wheels are associated with one another in three groups, each group including a first planet wheel P1, a second planet wheel P2 and a third planet wheel P3. The planet wheels of each group are mounted to be independently rotatable on a respective planet shaft 22. The (three) planet shafts 22, which extend parallel to the output shafts 12 and 20, are connected to a common carrier 24. Each set of planet wheels P1, P2, P3 is in mesh with a respective annulus wheel A1, A2 and A3. The three annulus wheels are connected together to form a composite unit and preferably, as in this case, simply constitute three separate sets of toothing on a single integral annular member.

Connected to the common carrier 24 is a radially inwardly extending annular brake disc 26, which constitutes one half of a first selectively actuable brake 28, referred to as the rear bias brake, the other half of which is constituted by two annular brake shoes 30, which may be moved together to engage the brake disc 26 by an actuator 32. Similarly, connected to the third sun wheel S3 is an outwardly extending annular brake disc 34, which constitutes one half of a second selectively actuable brake 36, referred to as the front bias brake, the other half of which is constituted by two annular brake shoes 38, which may be moved together to engage the brake disc 34 by an actuator 40. The two brake discs 26, 34 are coplanar and lie in a single radial plane and the two actuators are situated radially, one within the other, thereby occupying a minimum of space.

The two brakes 28, 34 are connected to a power source (not shown) and may be operated independently under the control of an electronic controller 50. Connected to the controller is a plurality of sensors, of which only one, 52, is shown schematically arranged to sense, and produce a signal representative of, a number of operating parameters of the vehicle and/or its engine, such as the vehicle speed, the steering wheel angle, the acceleration of the vehicle in each of three orthogonal directions, engine speed, engine torque, yaw rate, which engine gear is engaged, the differential output speed and torque supplied to the front axle and the differential output speed and torque supplied to the rear axle.

In a specific embodiment, the sun wheels S1, S2 and S3 had 42, 40 and 23 teeth, respectively, whilst each planet wheel P1, P2 and P3 had 24, 26 and 39 teeth, respectively, and the linked annulus A1, A2, and A3 had 90,92, and 101 teeth, respectively. The gear ratios of each meshing sun wheel and set of planet wheels are therefore all different.

It will be appreciated that, in use, application of the front bias clutch 36 will slow the sun wheel S3 which induces a ratio change across the sun wheels S1 and S2, the ratio being (A2/S2)/(A1/S1). This in turn produces a torque transfer from the rear output shaft 20 to the front output shaft 12. When the rear bias clutch is applied the reverse occurs and the carrier 24 is slowed which induces a ratio change across the sun gears S1 and S2, the ratio being (A3/S3-A1/S1)/(A3/S3-A2/S2). There is thus a torque transfer from the front output shaft 12 to the rear output shaft 20. This small ratio change produces a small tyre slip which is responsible for the torque difference between the axles. For example, a tyre slip difference of less than 0.5% could produce a torque bias ratio of 11.5, i.e. 92% to one axle and 8% to the other (i.e. a bias ratio of 92/8). By using pre-programmed algorithms, the controller can proportion the torque between the front and rear axles to optimise the vehicle performance. It will be appreciated that by appropriately operating the two brakes the percentage of the total torque which may be made available at each axle may thus be varied between 0% and 100%.

FIG. 2 shows a modified embodiment whose primary difference from the embodiment of FIG. 1 is that there are two and not three epicyclic geartrains in the further epicyclic differential gear system. Thus this transmission system includes an input shaft 2 which is connected to the carrier 8 of an epicyclic differential. The carrier carries a number of planet gears 6, which are in mesh with a sun gear 10 and with an annulus gear 4. The sun gear 10 is connected to a hollow output shaft 12, which is connected to the front axle 11, again by a chain drive coupling 14, 16, 18. The annulus gear 4 is connected to a shaft 20, which will be connected to the rear axle.

The output shafts 10 and 20 are again connected to a further epicyclic differential system which splits the torque transmitted through the two output shafts in a manner appropriate to the operating conditions of the vehicle. The annulus gear 4, and thus the shaft 20, is connected to a sun wheel S2 whilst the shaft 12 is connected to a coaxial sun wheel S1. The two sun wheels S1, S2 are in mesh with respective sets of three planet wheels P1, P2. The planet wheels are associated in three groups, each including a planet wheel P1 and a planet wheel P2. The planet wheels of each group are mounted to be independently rotatably on a respective planet shaft 22. The three planet shafts 22 are connected to a common carrier 24. Each set of planet wheels is in mesh with a respective annulus wheel A1, A2. The two annulus wheels are connected together to form a composite unit.

Connected to the common carrier 24 is a radially outwardly extending brake disc 26, which constitutes one half of a selectively actuable brake 28, the other half of which is constituted by two annular brake shoes 30, which again sandwich the brake disc and may be moved together to engage the brake disc by an actuator 32.

The brake is again connected to a power source (not shown) and may be operated under control of an electronic controller which is connected, as before, to a number of sensors.

The operation of this embodiment is substantially the same as that of the embodiment of FIG. 1, the difference being that torque may be transferred only from one axle to the other but not vice versa.

The invention claimed is:

1. A transmission system for a vehicle, the transmission system including an input shaft connected to a differential mechanism, which has two output shafts, the two output shafts carrying first and second coaxially mounted sun wheels, respectively, of an epicyclic gear system which mesh with first and second sets of planet wheels, respectively, which mesh with first and second annulus wheels, respectively, gear ratios of the first sun wheel with the first set of planet wheels and the second sun wheel with the second set of planet wheels being different, each planet wheel being mounted to rotate independently about a respective planet shaft, the planet shafts being connected to a common carrier which is rotatably mounted coaxially with the first and second sun wheels, the first and second annulus wheels being connected together, the carrier being connected to a selectively operable speed changing means arranged to increase or decrease the speed of rotation of the carrier about an axis, the transmission system further including at least one sensor arranged to produce a signal indicative of an operating parameter of the vehicle or an engine and a controller connected to the sensor and to the speed changing means and arranged to operate the speed changing means in response to said signal.

2. A transmission system as claimed in claim 1 in which the speed changing means is an electric motor.

3. A transmission system as claimed in claim 1 in which each first planet wheel is associated with a respective second planet wheel to constitute a set of planet wheels, each set of planet wheels being independently rotatably carried by a respective common planet shaft.

4. A transmission system as claimed in claim 3 in which the speed changing means is an electric motor.

5. A transmission system as claimed in claim 3 in which the speed changing means is a first brake.

6. A transmission system as claimed in claim 1 in which the speed changing means is a first brake.

7. A transmission system as claimed in claim 6 in which the epicyclic gear system includes a third sun wheel, which is mounted coaxially with the first and second sun wheels and is in mesh with a third set of planet wheels, the third set of planet wheels being in mesh with a third annulus wheel, which is connected to the first and second annulus wheels, a gear ratio of the third sun wheel with the third set of planet wheels being different to that of the second and first sun wheels with the second and first sets of planet wheels, respectively, each third planet wheel being mounted to rotate independently on a respective planet shaft, the third sun wheel being connected to a second selectively operable brake.

8. A transmission system as claimed in claim 7 in which the first and second brakes include annular brake discs which lie substantially in a single plane.

9. A transmission system as claimed in claim 7 in which each third planet wheel is associated with a respective pair of first and second planet wheels to form a set of planet wheels, each set of planet wheels being mounted to rotate independently on a respective planet shaft.

10. A transmission system as claimed in claim 9 in which the first and second brakes include annular brake discs which lie substantially in a single plane.

* * * * *